(12) United States Patent  (10) Patent No.: US 6,768,575 B2
Baba et al.  (45) Date of Patent: Jul. 27, 2004

(54) OPTICAL DEFLECTION ELEMENT

(75) Inventors: Toshihiko Baba, Tokyo (JP); Takeharu Tani, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/391,570

(22) Filed: Mar. 20, 2003

(65) Prior Publication Data

US 2003/0179991 A1 Sep. 25, 2003

(30) Foreign Application Priority Data

Mar. 25, 2002 (JP) ........................................ 2002-083355

(51) Int. Cl.⁷ ................................................. G02F 1/00
(52) U.S. Cl. ........................ 359/321; 359/322; 359/298; 385/27; 257/21
(58) Field of Search ................................ 359/321–322, 359/298, 577; 385/27, 36; 257/21

(56) References Cited

U.S. PATENT DOCUMENTS 6,448,997 B1 * 9/2002 Koide .......................... 347/250
6,621,644 B2 * 9/2003 Tokushima .................. 359/737

FOREIGN PATENT DOCUMENTS

| JP | 11-271541 | 10/1999 |
|----|-----------|---------|
| JP | 2000-56146 | 2/2000 |
| JP | 2000-66002 | 3/2000 |

OTHER PUBLICATIONS

H. Kosaka et al.; Superprism phenomena in photonic crystals; Physical Review B, vol. 58, No. 16.
H. Kosaka, et al.; Photonic crystals for micro lightwave circuits using wavelength–dependent angular beam steering; Applied Physics Letters, vol. 74, No. 10.

* cited by examiner

*Primary Examiner*—Drew A. Dunn
*Assistant Examiner*—Leo Boutsikaris
(74) *Attorney, Agent, or Firm*—Sughrue Mion, PLLC

(57) ABSTRACT

An optical deflection element for splitting light rays in accordance with a wavelength of incident light, includes a photonic crystal having an entrance end face and an exit end face, and having a refractive index which periodically changes depending upon positions thereof. The optical deflection element includes a region in which a propagation angle $\theta_C$ of the incident light within the photonic crystal changes in accordance with the wavelength of the incident light having entered at an incident angle $\theta_{IN}$ into the entrance end face, and a relationship among a wavelength $\lambda$ of the incident light in vacuum, a lattice constant A of the photonic crystal, the incident angle $\theta_{IN}$ and the propagation angle $\theta_C$ satisfies $(\partial\theta_C/\partial(A/\lambda))/(\partial\theta_C/\partial\theta_{IN}) > 10$.

8 Claims, 17 Drawing Sheets

OPTICAL DEFLECTION ELEMENT

BACKGROUND OF THE INVENTION

1. Field of the Invention

The present invention relates to an optical deflection element which causes light rays having different wavelengths to exit in different directions, and more particularly to an optical deflection element which employs a photonic crystal.

2. Description of a Related Art

Heretofore, a passive element such as a prism or a diffraction grating has been employed as an optical deflection element. However, since the passive element such as a prism or a diffraction grating has a narrow deflection angle in causing light to exit therefrom, it requires a long optical path in order to satisfactorily split light rays having different wavelengths. Accordingly, in an apparatus which includes the optical deflection element for deflecting the light rays having different wavelengths in a wide range, it has been necessary to enlarge the element itself or to enlarge the whole apparatus for the purpose of gaining the long optical path.

Besides, in recent years, photonic crystals which exhibit unique dispersion characteristics as compared with conventional optical crystals have also been employed. The characteristics exhibited by the photonic crystals are stated in, for example, H. Kosaka et al. "Superprism phenomena in photonic crystals", Physical Review B Vol. 58, No. 16, R10 096 to R10 099, 15 Oct. 1998-II), H. Kosaka et al. "Photonic crystals for micro lightwave circuits using wavelength-dependent angular beam steering" (Applied Physics Letters Vol. 74, No. 10, P. 1370–1372, 8 Mar. 1999, and Japanese Patent Application Laid-Open Publication JP-P2000-66002A.

Further, Japanese Patent Application Laid-Open Publication JP-P2000-56146A discloses a self-waveguide optical circuit in which photonic crystals are disposed at the main points of a substrate, whereby light is propagated in self-waveguiding fashion within the substrate so as to be split into a desired number of light rays. Furthermore, Japanese Patent Application Laid-Open Publication JP-A-11-271541 discloses a wavelength splitting circuit including two clads and a photonic crystal as its materials, for splitting light for every wavelength component owing to a structure in which the photonic crystal is interposed between the two clads.

The photonic crystal has been made smaller in size and higher in performance than the prism, the diffraction grating or the like by utilizing a superprism effect, but it still has a problem as stated below. Although the angle of light within the photonic crystal is greatly changed by a slight wavelength change, not only wavelength dispersion but also incident angle dispersion is great under the working conditions of the prior-art circuits disclosed in the above-mentioned patents, and hence, a high wavelength resolution cannot be attained considering the angular spread of an incident beam.

SUMMARY OF THE INVENTION

The present invention has been made in view of such a problem. An object of the present invention is to find out design conditions and working conditions for heightening a wavelength resolution and realize a high wavelength resolution in a wide wavelength range, in an optical deflection element which employs a photonic crystal.

In order to accomplish the object, an optical deflection element according to the first aspect of the present invention consists in an optical deflection element for splitting light rays in accordance with a wavelength of incident light, comprising a photonic crystal having an entrance end face and an exit end face, and having a refractive index which periodically changes depending upon positions thereof, wherein the element includes a region in which a propagation angle $\theta_C$ of the incident light within the photonic crystal changes in accordance with the wavelength of the incident light having entered at an incident angle $\theta_{IN}$ into the entrance end face so as to split the light rays having different wavelengths in accordance with different beam positions on the exit end face caused by a change of the propagation angle $\theta_C$ based on the wavelength of the incident light, and a relationship among a wavelength $\lambda$ of the incident light in vacuum, a lattice constant "A" of the photonic crystal, the incident angle $\theta_{IN}$ and the propagation angle $\theta_C$ satisfies $(\partial\theta_C/\partial(A/\lambda))/(\partial\theta_C/\partial\theta_{IN}) > 10$. Here, the element should preferably include the region in which the relationship $(\partial\theta_C/\partial(A/\lambda))/(\partial\theta_C/\partial\theta_{IN}) > 10$ is met, in the whole wavelength range where the element is used, that is, in the whole predetermined wavelength range.

Further, an optical deflection element according to the second aspect of the present invention consists in an optical deflection element for splitting light rays in accordance with a wavelength of incident light, comprising a photonic crystal having an entrance end face and an exit end face, and having a refractive index which periodically changes depending upon positions thereof, wherein the element includes a region in which a propagation angle $\theta_C$ of the incident light having a beam width $2w_0$ within the photonic crystal changes in accordance with the wavelength of the incident light having entered at an incident angle $\theta_{IN}$ into the entrance end face so as to split the light rays having different wavelengths in accordance with different beam positions on the exit end face caused by a change of the propagation angle $\theta_C$ based on the wavelength of the incident light, and a center wavelength $\lambda$ of a wavelength range of the incident light in vacuum, a lattice constant "A" of the photonic crystal, a refractive index n of a material at the entrance end face, a wavelength resolution $\Delta\lambda$ of the optical deflection element and an optical path length L along which the entered light propagates within the photonic crystal satisfy $\{(\partial\theta_C/\partial(A/\lambda))/(\partial\theta_C/\partial\theta_{IN})\}\cdot 2\lambda^3/(\pi n A w_0) > \Delta\lambda$, and $\pi n w_0^2 / \{\lambda\cdot(\partial\theta_C/\partial\theta_{IN})\} < L$.

According to the present invention, it is possible to enhance the wavelength resolution of an optical deflection element employing a photonic crystal and to heighten the functions of the optical deflection element. Besides, since the size of the crystal necessary for obtaining a predetermined wavelength resolution can be calculated, the crystal of unnecessarily large size need not be prepared. It is accordingly permitted to reduce the size of the element and to curtail the cost thereof.

DESCRIPTION OF THE PREFERRED EMBODIMENTS

Now, embodiments of the present invention will be described with reference to the accompanying drawings. Incidentally, various numerical values used hereinbelow are merely values for the brevity of the description, and they shall be alterable to multifarious values within the scope of the present invention.

Figure 1:
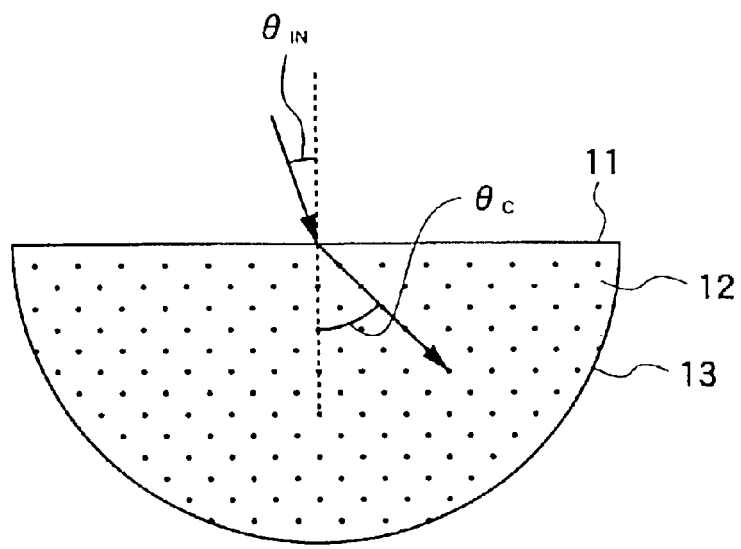
FIG. 1 is a plan view showing an optical deflection element using a semicolumnar photonic crystal containing silicon as its material.
Figure 2:
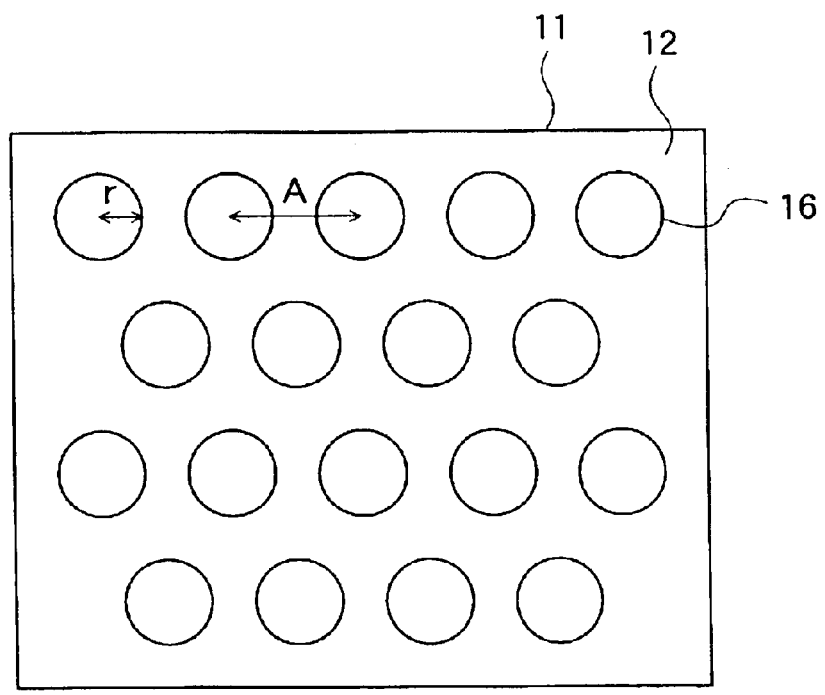
FIG. 2 is a plan view showing the shape of a photonic crystal region in FIG. 1.

FIG. 1 is a plan view showing an optical deflection element which is formed of a semicolumnar photonic crystal containing silicon as its material. Light enters from an entrance end face 11 into a photonic crystal region 12 at an incident angle $\theta_{IN}$, and propagates in the direction of an intracrystal propagation angle $\theta_C$ within the photonic crystal region 12. Besides, the light having propagated in the direction of the intracrystal propagation angle $\theta_C$ within the photonic crystal region 12 exits from an exit end face 13. As shown in FIG. 2, in the photonic crystal region 12, a plurality of cavities 16 each of which is in the shape of a column having a radius "r" are arranged in the shape of two-dimensional triangular lattice at a lattice constant "A" in parallel with the entrance end face 11, and they are filled up with air.

Next, there will be explained the intracrystal propagation angle $\theta_C$ of the light which propagates in the photonic crystal region 12. Here, it is assumed by way of example that the effective refractive index of silicon be 3.065, that the wavelength of the light to-be-handled in vacuum be 1.55 $\mu$m, that the radius "r" of each cavity 16 be 0.387 $\mu$m, and that the lattice constant "A" be 0.93 $\mu$m.

Figure 3:
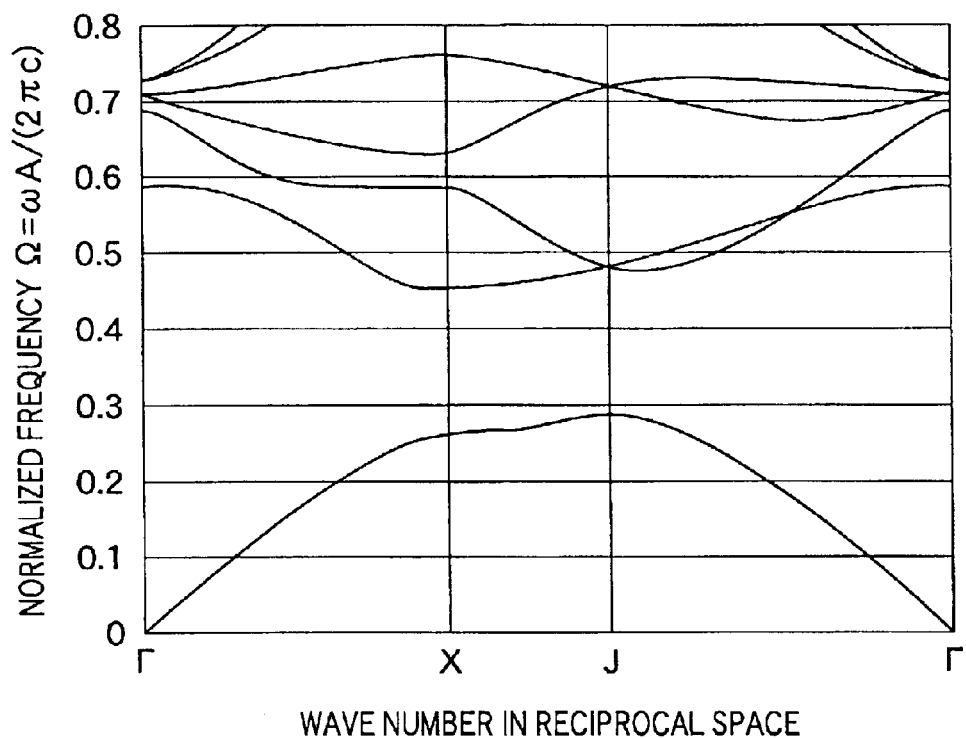
FIG. 3 is a photonic band diagram of the photonic crystal region in FIG. 1.

The propagation light in the photonic crystal is affected by multiple scattering ascribable to the periodic structure of this crystal, and its propagation characteristic is elucidated by a photonic band diagram which is similar to the band diagram of electrons in a semiconductor. In a case, for example, where light propagates in parallel with the sheet of the drawing within the photonic crystal region 12 in FIG. 1 and where its deflection plane is also parallel to the sheet of the drawing, a photonic band diagram (reduced zone scheme) as shown in FIG. 3 is obtained. Such a photonic band diagram affords the relationship between a wave number vector in a reciprocal space and a normalized frequency $\Omega=\omega A/(2\pi c)$ where $\omega$ denotes the angular frequency of the light, and "c" the velocity of the light in vacuum.

Figure 4:
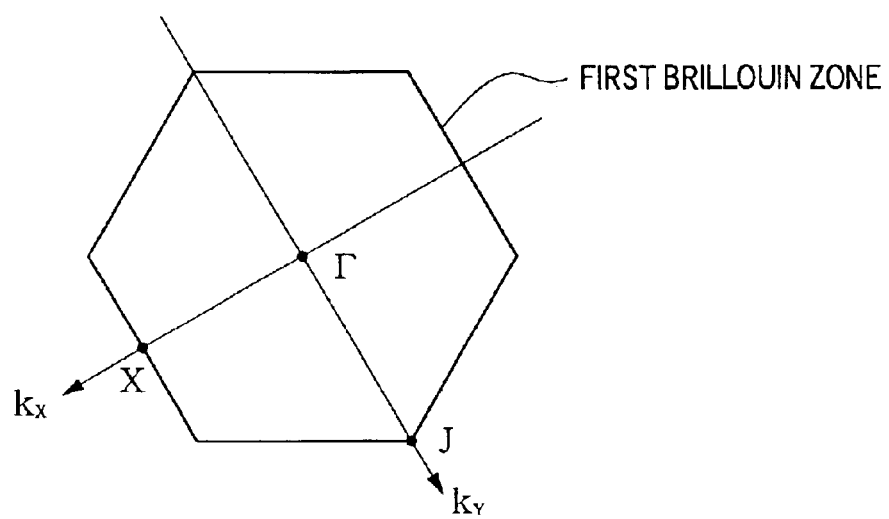
FIG. 4 is a diagram showing the first Brillouin zone of the photonic crystal region in FIG. 1.

Incidentally, symbols "Γ", "J" and "X" affixed on the axis of abscissas in FIG. 3 denote specified wave number vectors in the first Brillouin zone as shown in FIG. 4.

Figure 5:
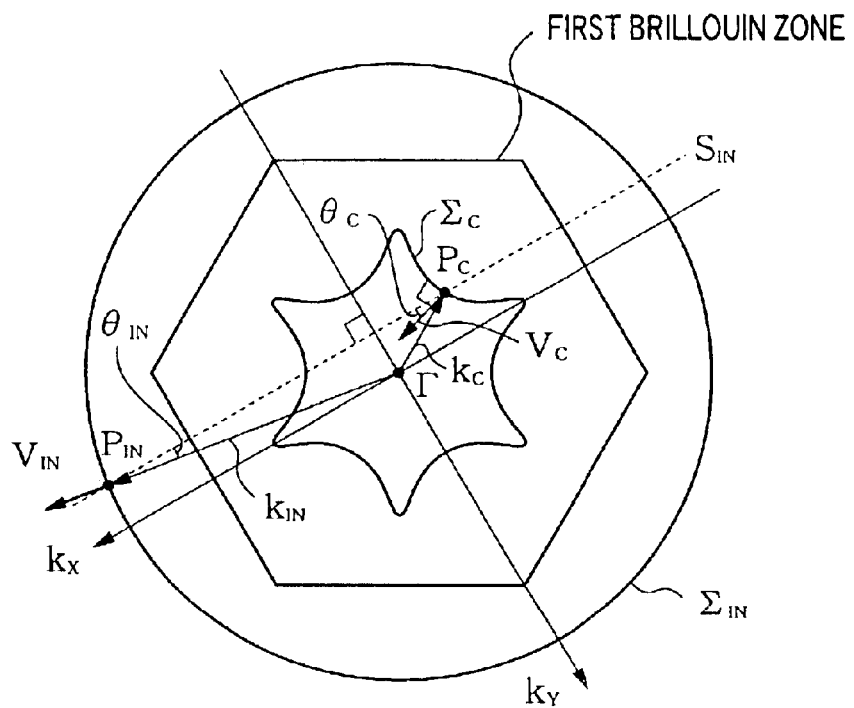
FIG. 5 is a diagram for explaining a method in which the wave number vector and propagation direction of light propagating within a photonic crystal region are found by drawing a diagram, on the basis of the wave number vector of incident light.

FIG. 5 is a diagram for explaining a method in which the wave number vector and propagation direction of the light propagating within the photonic crystal region 12 are found by drawing a diagram, on the basis of the wave number vector of the light incident on the entrance end face 11 in FIG. 1.

In FIG. 5, an equifrequency dispersion plane $\Sigma_{IN}$ in the air and an equifrequency dispersion plane $\Sigma_C$ in the photonic crystal region 12 are shown. By the way, in FIG. 5, a $k_Y$-axis is accorded with the tangential direction of the entrance end face 11, and a $k_X$-axis is accorded with the normal direction of the entrance end face 11.

As shown in FIG. 5, a vector $k_{IN}$ whose tail is the point Γ and whose head is a point $P_{IN}$ on the equifrequency dispersion plane $\Sigma_{IN}$ affords a wave number vector whose components are the coordinates of the point $P_{IN}$. Besides, an outward normal vector $V_{IN}$ at the point $P_{IN}$ of the equifrequency dispersion plane $\Sigma_{IN}$ affords the direction in which the light of the wave number vector $k_{IN}$ propagates in the air. Likewise, a vector $k_C$ whose tail is the point $\Gamma$ and whose head is a point $P_C$ on the equifrequency dispersion plane $\Sigma_C$ affords a wave number vector whose components are the coordinates of the point $P_C$. Also, an outward normal vector $V_C$ at the point $P_C$ of the equifrequency dispersion plane $\Sigma_C$ affords the direction in which the light of the wave number vector $k_C$ propagates in the air. Incidentally, the sense of the vector $V_C$ is taken in the direction in which the sign of $\partial\omega/\partial k$ becomes positive.

At the boundary surface between two different media, the component of the wave number vector tangential to this surface is conserved. Accordingly, the $k_Y$ component of the wave number vector is conserved in FIG. 5.

The $k_{IN}$ component of the wave number vector is equal to the $k_Y$ coordinate value of the intersection point between the $k_Y$-axis and a perpendicular (Snell line) $S_{IN}$ drawn from the point $P_{IN}$ down to the $k_Y$-axis. Accordingly, the vector $k_C$ whose tail is the point $\Gamma$ and whose head is the intersection point $P_C$ between the equifrequency dispersion plane $\Sigma_C$ and the Snell line $S_{IN}$ affords the wave number vector of the light which propagates within the photonic crystal region 12 in FIG. 2. Besides, the angle $\theta_C$ which is defined between the $k_X$-axis and the normal vector $V_C$ at the point $P_C$ of the equifrequency dispersion plane $\Sigma_C$ affords the angle of refraction of the light which is incident on the entrance end face 11 at the incident angle $\theta_{IN}$. The light having the wave number vector $k_C$ propagates in the direction of the intracrystal propagation angle $\theta_C$ within the photonic crystal region 12 in FIG. 2.

Next, there will be explained a case where a Gaussian beam having a width $2w_0$ enters into the photonic crystal region 12. Here, it is assumed that the Gaussian beam form a beam waist at the entrance end face 11.

If the photonic crystal behaves like a free space of refractive index "n", the beam width $2w$ of the Gaussian beam at the exit end face 13 is given by Eq. (1):

$$2w = 2\sqrt{w_0^2 + (\Delta\theta_0 L)^2} = 2\sqrt{w_0^2 + \left(\frac{\lambda L}{\pi n w_0}\right)^2} \quad (1)$$

Here, $\lambda$ denotes the wavelength of the Gaussian beam in vacuum. Besides, $\Delta\theta_0$ denotes a half spread angle which the incident beam has at a great distance, and which is given by Eq. (2):

$$\Delta\theta_0 = \frac{\lambda}{\pi n w_0} \quad (2)$$

Figure 6:
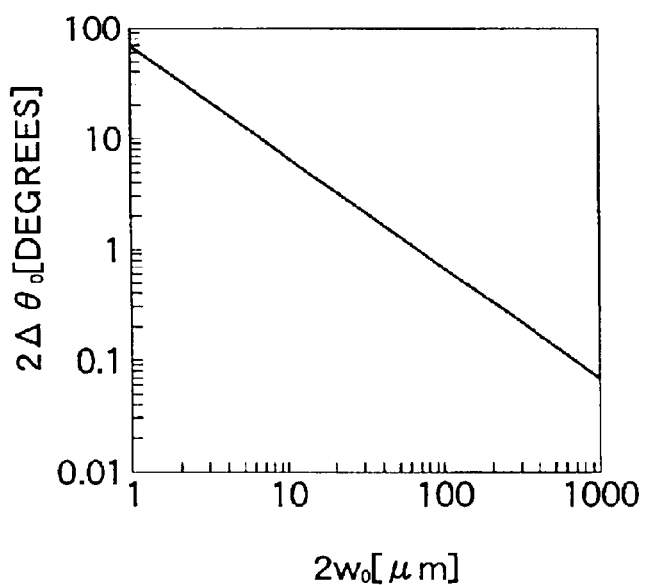
FIG. 6 is a diagram showing the change of a full spread angle versus an incident beam width.

FIG. 6 is a diagram showing the change of a full spread angle $2\Delta\theta_0$ versus the incident beam width $2w_0$, in the case of assuming the wavelength $\lambda=1.55$ $\mu$m and the effective refractive index $n=3.065$. As shown in FIG. 6, in order to make the full spread angle $2\Delta\theta_0$ at most 1°, the incident beam width $2w_0$ needs to be set at 60 $\mu$m or so.

As shown in FIG. 5, however, the light undergoes the effect of being spread or collimated by the curvature of an equifrequency curve in the photonic crystal region 12 unlike in the free space. This effect is represented by the quantity "p" of Eq. (3):

$$p \equiv \frac{\delta\theta_C}{\delta\theta_{IN}} \quad (3)$$

The incident Gaussian beam is the superposition of plane waves which have the angular spread as shown in FIG. 6. On condition that the half spread angle $\Delta\theta_0$ is small, the spread $\Delta\theta_C$ of the light in the photonic crystal region 12 is given by $\Delta\theta_C=(\partial\theta_C/\partial\theta_{IN})\Delta\theta_0=p\Delta\theta_0$. That is, the angular spread of the incident Gaussian beam changes "p" times in the photonic crystal region 12. Accordingly, the beam width $2w$ at the exit end face 13 is given by Eq. (4):

$$2w = 2w_0\sqrt{1 + \left(p\frac{\lambda L}{\pi n w_0^2}\right)^2} \quad (4)$$

Besides, an angle $\Delta\theta_{OUT}$ which this beam width occupies at a far exit position is given by Eq. (5):

$$\Delta\theta_{OUT} = \frac{2w}{L} = 2\sqrt{\left(\frac{w_0}{L}\right)^2 + \left(p\frac{\lambda L}{\pi n w_0}\right)^2} \quad (5)$$

Next, a quantity "q" which represents the rate of change of the intracrystal propagation angle $\theta_C$ in the case of slightly changing the wavelength $\lambda$ shall be defined by Eq. (6):

$$q \equiv \frac{\delta\theta_C}{\delta(A/\lambda)} \quad (6)$$

Here, $A/\lambda$ denotes the normalized frequency of the photonic crystal. Besides, using the normalized frequency, a normalized wavelength width $\Delta\lambda/\lambda$ which the photonic crystal can resolve is given by Eq. (7):

$$\frac{\Delta\lambda}{\lambda} = \left|\frac{\Delta(A/\lambda)}{(A/\lambda)}\right| = \left|\frac{\delta(A/\lambda)}{\delta\theta_C} \cdot \frac{\Delta\theta_C}{(A/\lambda)}\right| \quad (7)$$

In this regard, $\Delta\theta_C$ denotes a spread which the Gaussian beam has in the photonic crystal region 12, and actually the angle $\Delta\theta_{OUT}$ occupied at the exit end face 13 is an angle which can be effectively resolved. Therefore, the actual normalized wavelength width $\Delta\lambda/\lambda$ is given by Eq. (8):

$$\frac{\Delta\lambda}{\lambda} = \left|\frac{\delta(A/\lambda)}{\delta\theta_C} \cdot \frac{\Delta\theta_{out}}{(A/\lambda)}\right| \quad (8)$$

$$= \left|\frac{1}{q} \cdot \frac{2\lambda}{A}\sqrt{\left(\frac{w_0}{L}\right)^2 + \left(p\frac{\lambda}{\pi n w_0}\right)^2}\right|$$

Here, on condition that Eq. (9) holds true, the normalized wavelength width $\Delta\lambda/\lambda$ is given by Eq. (10):

$$\frac{w_0}{L} << \left|p\frac{\lambda}{\pi n w_0}\right| \text{ or, } L >> \left|\frac{\pi n w_0^2}{\lambda} \cdot \frac{1}{p}\right| \quad (9)$$

$$\frac{\Delta\lambda}{\lambda} = \left|\frac{p}{q} \cdot \frac{2\lambda^2}{\pi n A w_0}\right| \quad (10)$$

As indicated by Eq. (10), as the value of a ratio p/q is smaller, the normalized wavelength width $\Delta\lambda/\lambda$ becomes smaller, and hence, a wavelength resolution is enhanced more. Here, as the value of the quantity "p" becomes smaller, a collimating property is more intense, and more resolved points can be obtained, but an element length needs to be set great as indicated by Eq. (9). Besides, as the incident beam width $w_0$ is greater, the wavelength resolution can be heightened more, but similarly the element length needs to be set great. Incidentally, the number of points at which wavelengths can be resolved (hereinbelow, termed "resolvable points") is determined by the extent of a frequency range in which Eq. (10) satisfies a predetermined resolution.

Favorable for the application to the optical deflection element is a region where the ratio p/q is as small as possible and where the change of the ratio p/q in the case of changing the frequency with the incident angle fixed is small. The inventors, therefore, have set the design conditions such as a crystal size and the working conditions such as a beam size to realize a necessary resolution, by selecting the smallest possible incident beam width $w_0$ in a range in which the necessary resolution and the necessary number of resolvable points are satisfied, as explained below.

Figure 7:
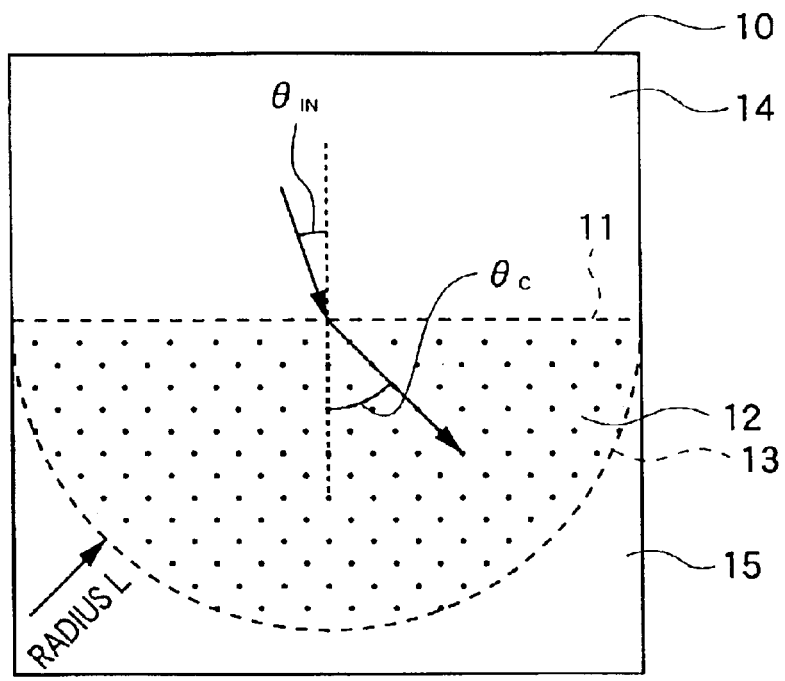
FIG. 7 is a plan view showing the shape of an optical deflection element according to the first embodiment of the present invention.

FIG. 7 is a plan view showing the shape of an optical deflection element according to the first embodiment of the present invention.

Figure 8:
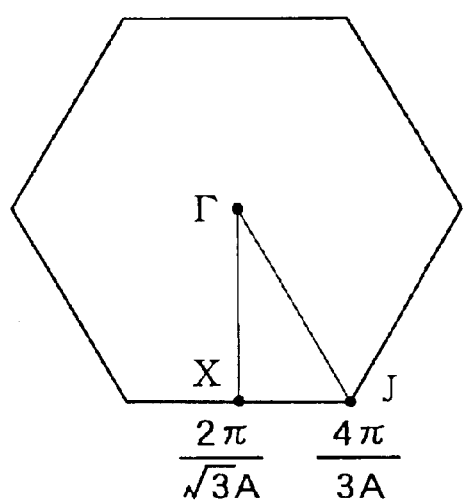
FIG. 8 is a diagram showing the first Brillouin zone of the photonic crystal region of the optical deflection element according to the first embodiment of the present invention.

As shown in FIG. 7, a semicolumnar photonic crystal region 12 having a radius L is formed centrally of a substrate 10 whose material is silicon. Light enters from the non-photonic crystal region (14) side of an entrance end face 11 into the photonic crystal region 12 at an incident angle $\theta_{IN}$, and propagates in the direction of an intracrystal propagation angle $\theta_C$ within the photonic crystal region 12. Besides, the light having propagated in the direction of the intracrystal propagation angle $\theta_C$ within the photonic crystal region 12 exits into a non-photonic crystal region 15 at an exit end face 13. As shown in FIG. 2, in the photonic crystal region 12, a plurality of cavities 16 which are parallel to the entrance end face 11 and each of which is in the shape of a column having a radius "r" are arranged in the shape of two-dimensional triangular lattice at a lattice constant "A". Besides, the entrance end face 11 is parallel to a Γ-J direction in the first Brillouin zone as shown in FIG. 8. In this embodiment, the effective refractive index "n" of the silicon substrate 10 is 3.065, the radius "r" of each cavity 16 is 0.312A, and the cavities 16 are filled up with air.

Such a photonic crystal region 12 is formed by, for example, depositing a resist on the non-photonic crystal regions 14, 15 and on the part of the photonic crystal region 12 not to be formed with the cavities 16, and thereafter subjecting the substrate 10 to dry etching of good perpendicularity.

Incidentally, a substance other than silicon (for example, polymer, sapphire, quartz or glass) may well be employed as the material of the substrate 10, and a medium other than the air as has a refractive index different from that of the substrate 10 (for example, polymer, dielectric or glass) may well be packed in the cavities 16.

Figure 9A:
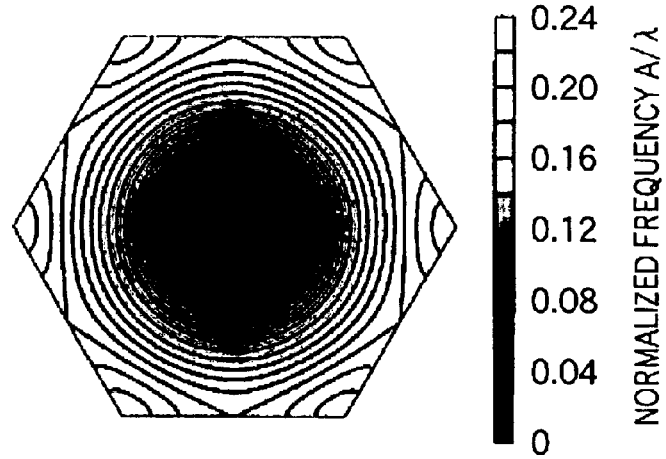
FIGS. 9A–9C are diagrams in which the dispersion planes of the first band to the third band within the range of the first Brillouin zone are respectively displayed in gradation.
Figure 9B:
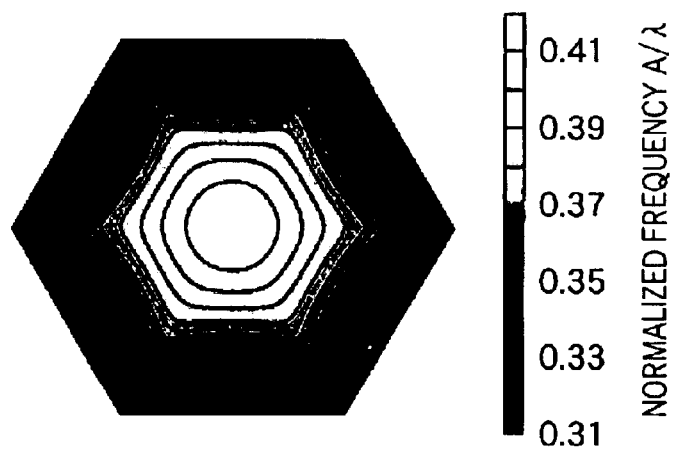
Figure 9C:
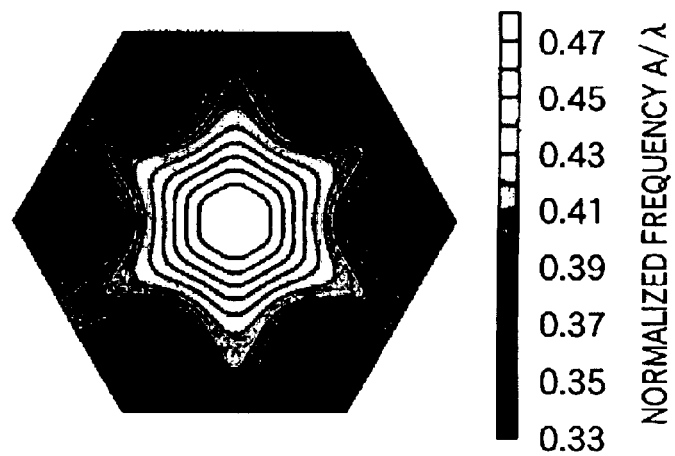

FIGS. 9A–9C are diagrams in which the dispersion planes of the first band to the third band in the range of the first Brillouin zone of the photonic crystal region 12 are respectively displayed in gradation. Since the propagation direction of light within the photonic crystal region 12 becomes the normal direction of the equifrequency dispersion plane as shown in FIG. 5, the propagation directions of the light can be respectively found by computing the gradients of the dispersion planes shown in FIGS. 9A–9C.

Figure 10A:
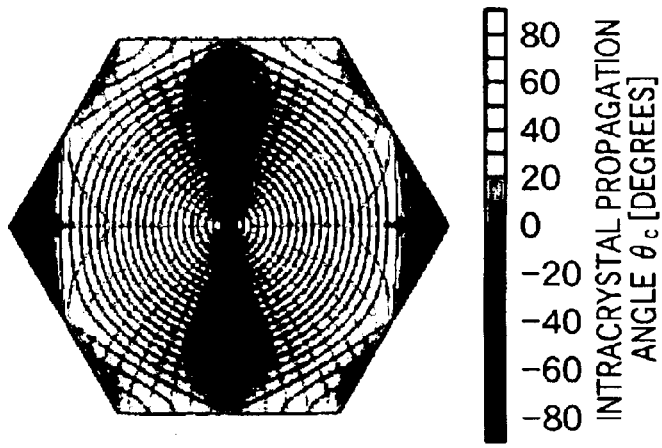
FIGS. 10A–10C are diagrams each showing an intracrystal propagation angle $\theta_C$ which has been evaluated on the basis of the gradient of the dispersion plane.
Figure 10B:
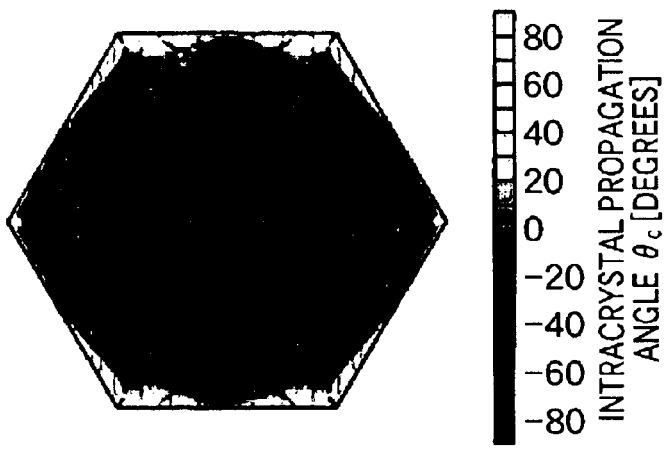
Figure 10C:
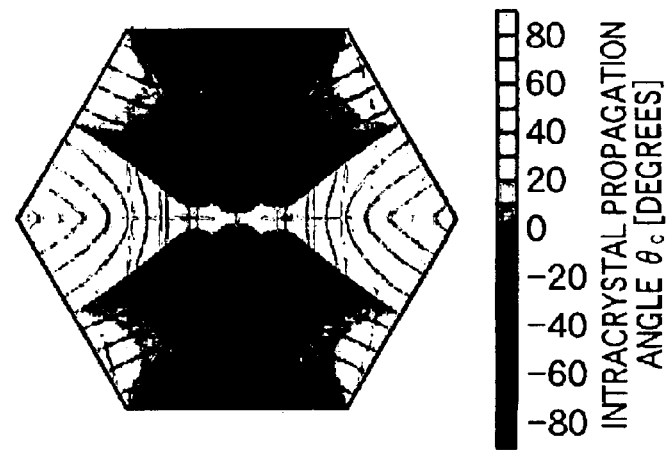

FIGS. 10A–10C are diagrams showing intracrystal propagation angles $\theta_C$ which have been evaluated on the basis of the gradients of the dispersion planes as shown in FIGS. 9A–9C, respectively. Besides, lines in FIGS. 10A–10C indicate equi-incident angle lines. The equi-incident angle line indicates the change of an entrance condition within the photonic crystal region 12 in the case of changing the frequency under the condition that the incident angle $\theta_{IN}$ for the photonic crystal region 12 is constant. A central vertical line indicates a case where the incident angle $\theta_{IN}=0°$ holds, that is, where the light is normally incident, and lines carved every 5° on each of the right and left sides indicate cases where the incident angle $\theta_{IN}$ is changed. As shown in FIG. 5, the entrance condition at a specified incident angle and a specified frequency can be found by drawing the Snell line from the side on which the component of the wave number vector tangential to the entrance end face 11 is conserved.

Figure 11A:
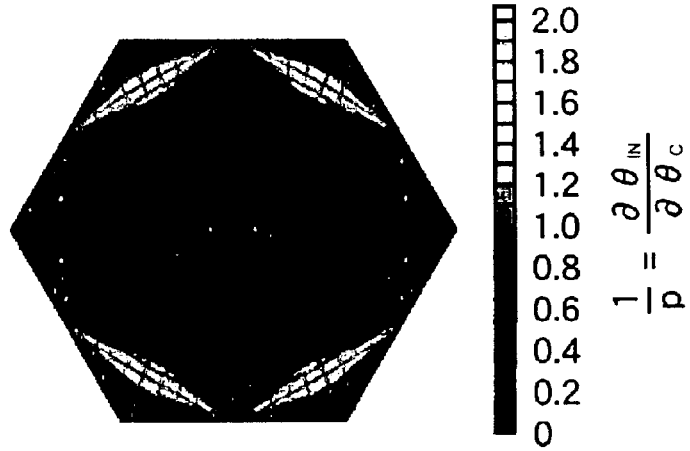
FIGS. 11A–11C are diagrams each showing a quantity 1/p which has been calculated on the basis of the intracrystal propagation angle $\theta_C$.
Figure 11B:
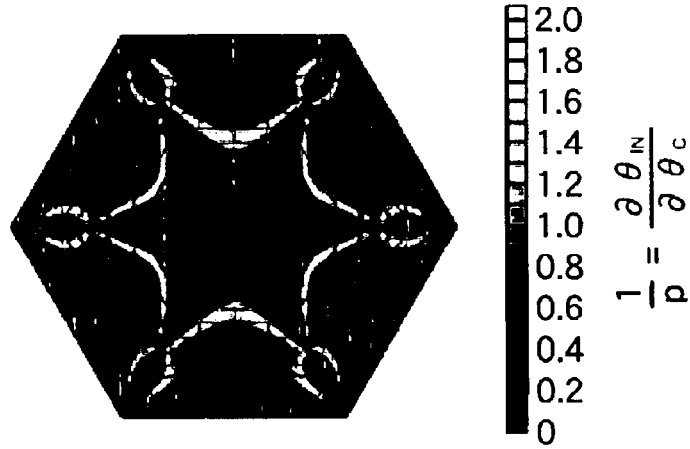
Figure 11C:
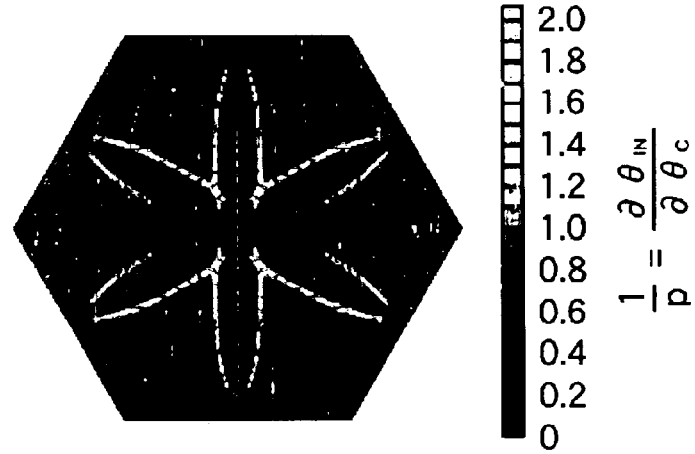

FIGS. 11A–11C are diagrams showing the values of a quantity 1/p which have been respectively calculated on the basis of the intracrystal propagation angles $\theta_C$ as shown in FIGS. 10A–10C. As indicated by Eq. (3), the value of the quantity 1/p is calculated by computing the differential value "p" of the intracrystal propagation angle $\theta_C$ in a direction perpendicular to the equi-incident angle line, and then obtaining the reciprocal of the differential value "p".

Figure 12A:
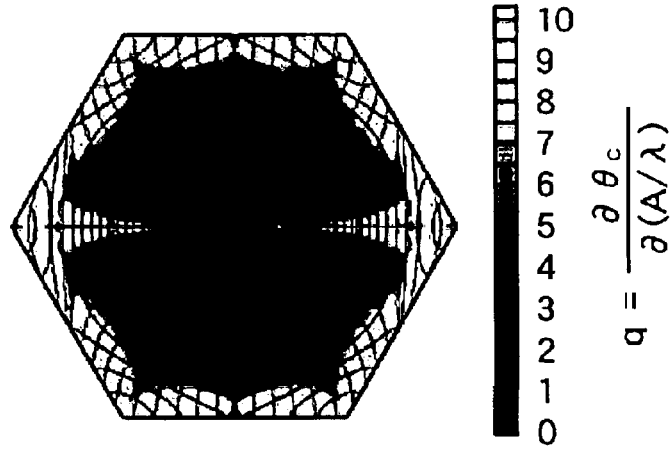
FIGS. 12A–12C are diagrams each showing a quantity q which has been calculated on the basis of the intracrystal propagation angle $\theta_C$.
Figure 12B:
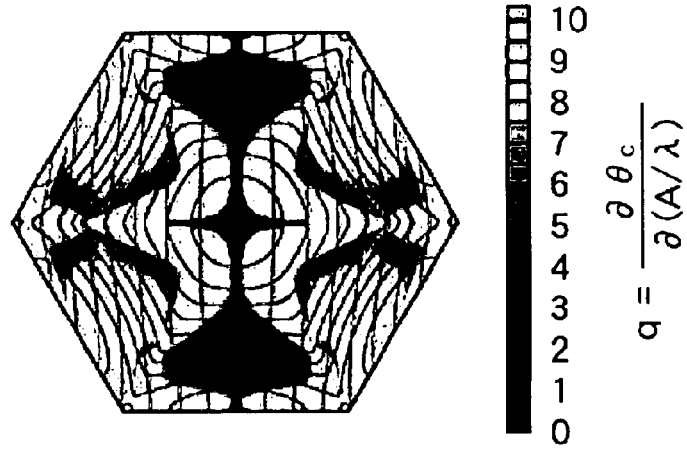
Figure 12C:
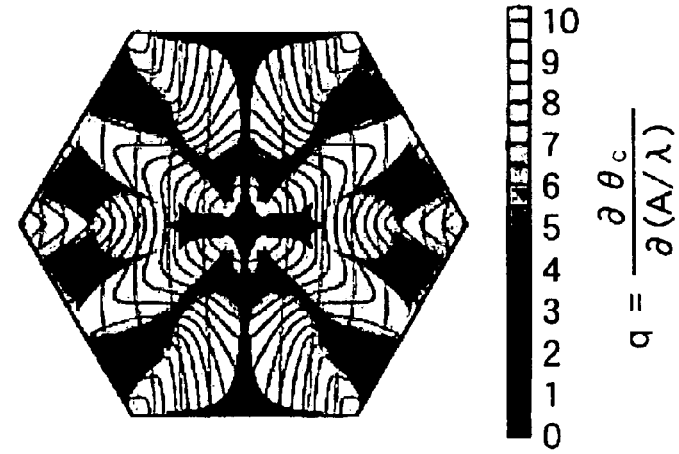

FIGS. 12A–12C are diagrams showing the values of a quantity "q" which have been respectively calculated on the basis of the intracrystal propagation angles $\theta_C$ as shown in FIGS. 10A–10C. As indicated by Eq. (6), the value of the quantity "q" is calculated by computing the differential of the intracrystal propagation angle $\theta_C$ in the gradient direction of the dispersion plane.

Figure 13A:
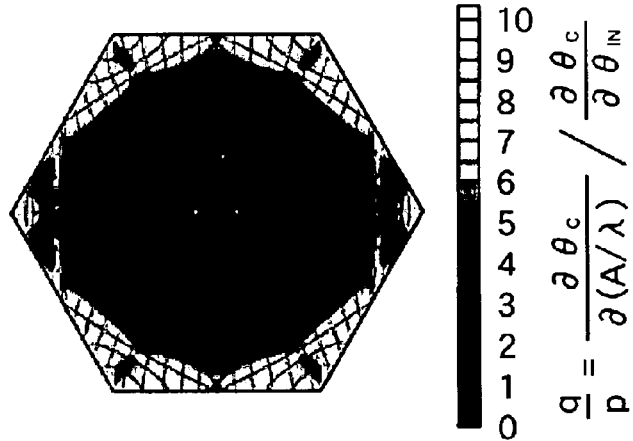
FIGS. 13A–13C are diagrams each showing a ratio q/p which has been calculated on the basis of the quantity 1/p and the quantity q.
Figure 13B:
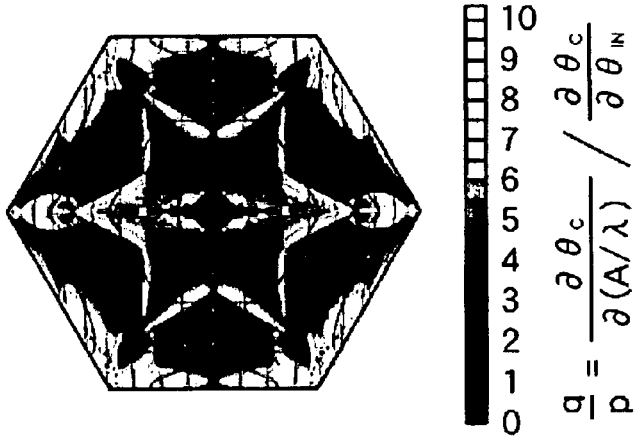
Figure 13C:
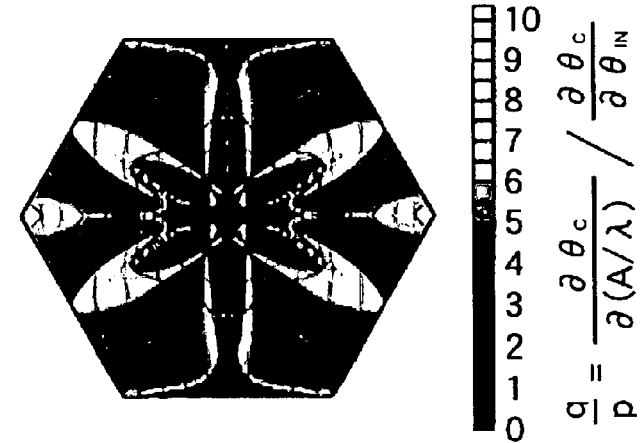

FIGS. 13A–13C are diagrams showing the values of a ratio q/p which have been respectively calculated on the basis of the values of the quantity 1/p as shown in FIGS. 11A–11C and the values of the quantity "q" as shown in FIGS. 12A–12C. FIGS. 13A–13C represent the characteristic that a higher wavelength resolution is demonstrated as the ratio q/p is greater (at a brighter part).

There has heretofore been deemed favorable that condition of an abrupt change under which the equifrequency dispersion plane is uneven as at the part between points C and D as shown in FIG. 4 of H. Kosaka et al. "Superprism phenomena in photonic crystals", Physical Review B Vol. 58, No. 16, R10 096 to R10 099, 15 Oct. 1998-II. Such a part, however, does not accord with a part of high wavelength resolution.

Here, it is assumed that the wavelength of the light to-be-handled be 1550 nm, and that a necessary wavelength resolution $\Delta\lambda$ be 1 nm. Also, it is assumed that a center normalized frequency be $A/\lambda=0.4$, in other words, that $A=620$ nm hold, and that q/p=10 hold in view of FIGS. 13A–13C. Then, the incident beam width $w_0$ becomes nearly equal to 125 μm. Accordingly, when a beam having a width of at least 250 μm is entered into the photonic crystal, the necessary resolution is satisfied. Besides, the size of the crystal required on this occasion is calculated from Eq. (9). Assuming 1/p=2 in view of FIGS. 11A–11C, the size of the crystal needs to be at least 194 mm.

In addition, FIGS. 13A–13C represent the characteristic that, when the ratio q/p is observed along the equi-incident angle line, the high wavelength resolution is held in a wider wavelength range as the number of equifrequency lines intersecting with the equi-incident angle line is larger. By way of example, near that region of FIG. 13B which corresponds to the region of an incident angle of 10° to 11° and a normalized frequency of 0.39 to 0.41 as shown in FIG. 9B for the exemplary second band, a region where the ratio q/p continuously exceeds 10 is existent, and the high resolution is held in the range of the wavelength λ from about 1.51 μm to about 1.59 μm.

Next, further embodiments of the present invention will be described.

Figure 14:
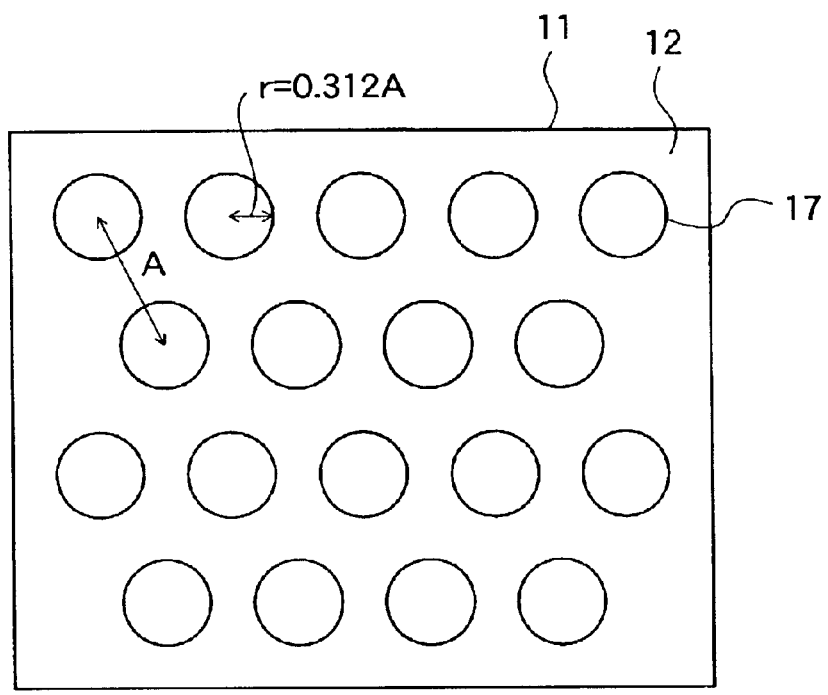
FIG. 14 is a plan view showing the shape of the photonic crystal region of an optical deflection element according to the second embodiment of the present invention.
Figure 15:
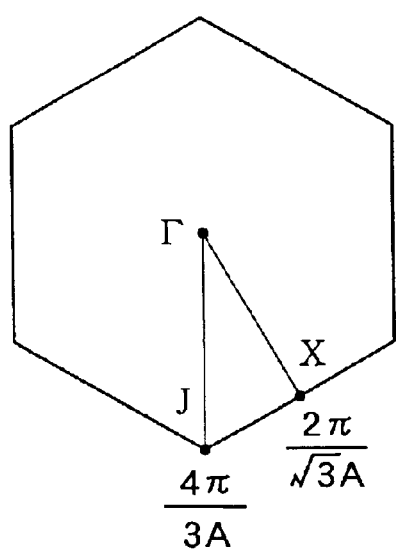
FIG. 15 is a diagram showing the first Brillouin zone of the photonic crystal region of the optical deflection element according to the second embodiment of the present invention.

FIG. 14 is a plan view showing the shape of the photonic crystal region of an optical deflection element according to the second embodiment of the present invention. Besides, FIG. 15 is a diagram showing the first Brillouin zone of the photonic crystal region of the optical deflection element according to this embodiment. As shown in FIG. 14, a plurality of cavities 17 which are parallel to an entrance end face 11 and each of which is in the shape of a column having a radius "r" are arranged in the shape of two-dimensional triangular lattice at a lattice constant "A". Besides, the entrance end face 11 is parallel to a Γ-X direction in the first Brillouin zone shown in FIG. 15. In this embodiment, the effective refractive index "n" of a silicon substrate 10 is 3.065, the radius "r" of each cavity 16 is 0.312A, and the cavities 17 are filled up with air.

Figure 16A:
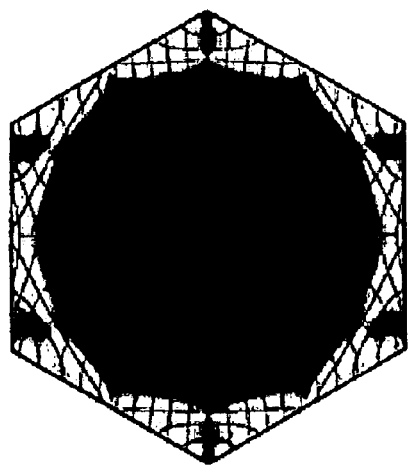
FIGS. 16A–16C are diagrams in which the values of a ratio q/p for the first band to the third band are respectively shown within the range of the first Brillouin zone in the photonic crystal region.
Figure 16B:
Figure 16C:
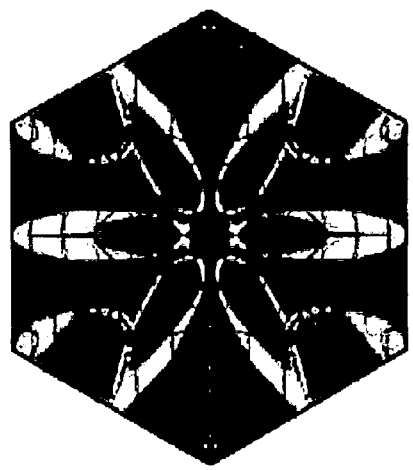

FIGS. 16A–16C are diagrams in which the values of a ratio q/p for the first band to the third band are respectively shown within the range of the first Brillouin zone in the photonic crystal region. As shown in FIGS. 16A–16C, it is understood that regions of high resolutions exist also in this embodiment. As compared with those of the first embodiment, however, the number of equifrequency lines intersecting with each equi-incident angle line is smaller, and a frequency range satisfying the condition of high resolution is narrower. Accordingly, in a case where the optical deflection element is to be operated in a wide wavelength range, the use of the first embodiment in which the entrance face is parallel to the Γ-J direction is better.

Figure 17:
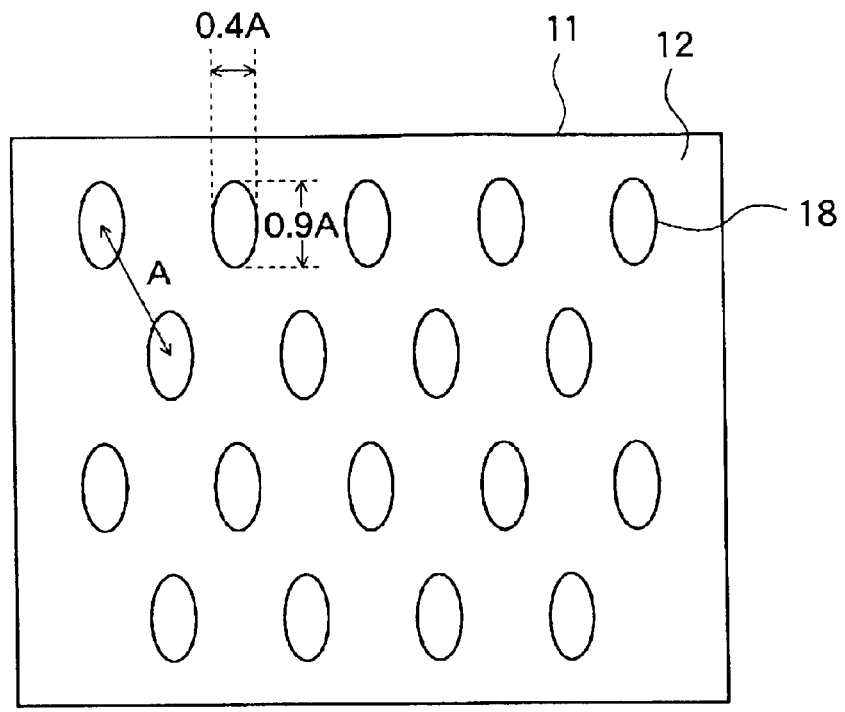
FIG. 17 is a plan view showing the shape of the photonic crystal region of an optical deflection element according to the third embodiment of the present invention.
Figure 18:
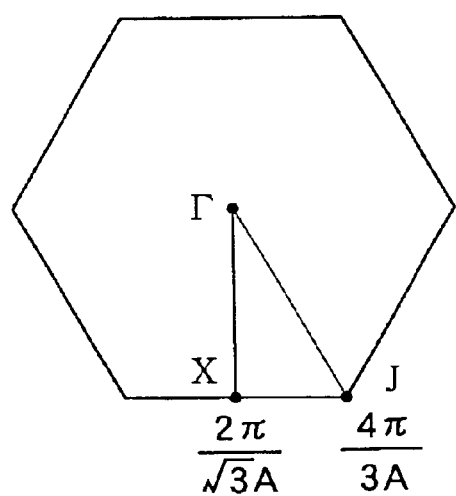
FIG. 18 is a diagram showing the first Brillouin zone of the photonic crystal region of the optical deflection element according to the third embodiment of the present invention.

FIG. 17 is a plan view showing the shape of the photonic crystal region of an optical deflection element according to the third embodiment of the present invention. In this embodiment, the sectional shape of each cavity is an ellipse which has a major axis perpendicular to an entrance end face 11. Besides, FIG. 18 shows the first Brillouin zone of the photonic crystal region of the optical deflection element according to this embodiment.

As shown in FIG. 17, a plurality of cavities 18 which are parallel to the entrance end face 11 are arranged in the shape of two-dimensional triangular lattice at a lattice constant "A". Besides, the entrance end face 11 is parallel to a Γ-J direction in the first Brillouin zone as shown in FIG. 18. In this embodiment, the effective refractive index "n" of a silicon substrate 10 is 3.065, the major axis and minor axis of each cavity 18 are 0.9A and 0.4A, respectively, and the cavities 18 are filled up with air.

Figure 19A:
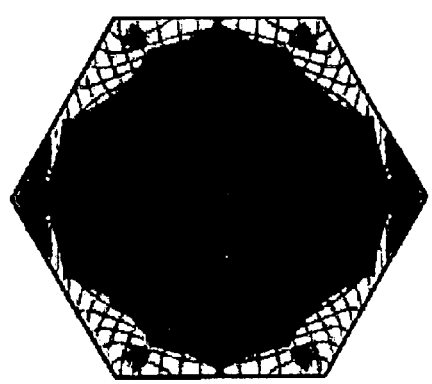
FIGS. 19A–19C are diagrams in which the values of a ratio q/p for the first band to the third band are respectively shown within the range of the first Brillouin zone in the photonic crystal region.
Figure 19B:
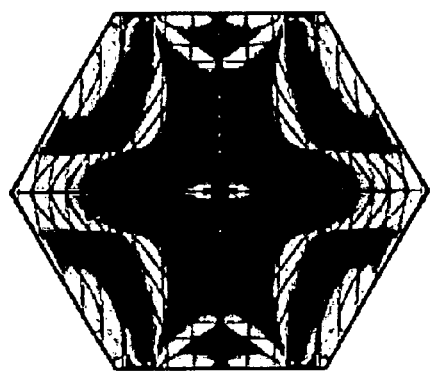
Figure 19C:
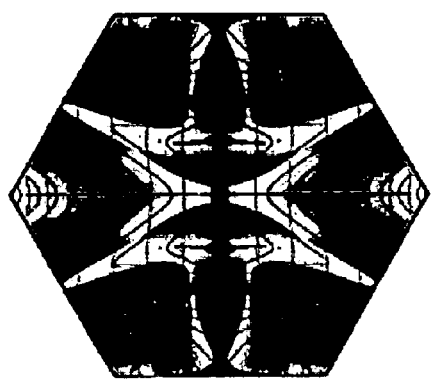

FIGS. 19A–19C are diagrams in which the values of a ratio q/p for the first band to the third band are respectively shown within the range of the first Brillouin zone in the photonic crystal region 12. As shown in FIGS. 19A–19C, it is understood that regions of high resolutions exist also in this embodiment. As compared with that of the first embodiment, a frequency range of high resolution widens more near the region of an incident angle of 10° for the second band, so that the third embodiment is usable in a wider wavelength range.

Figure 20:
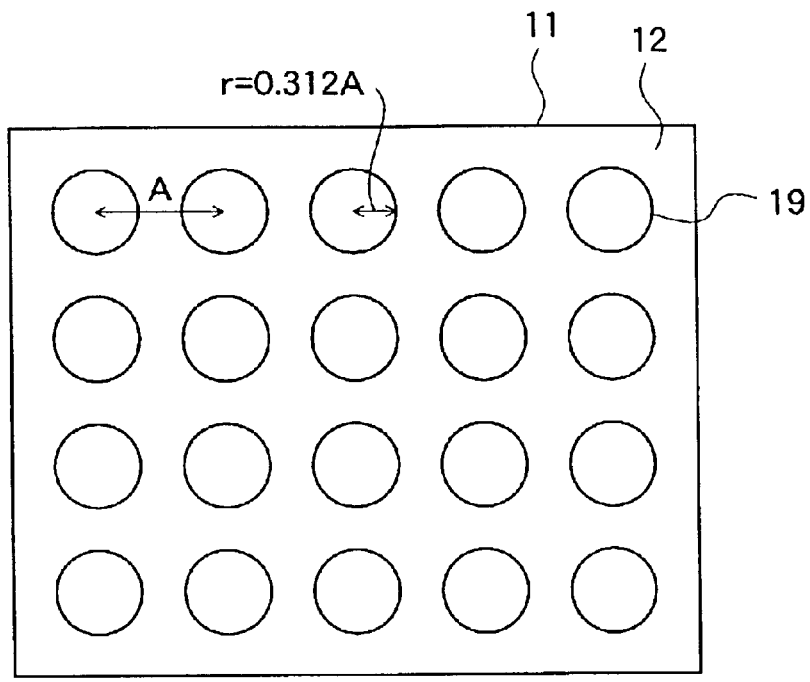
FIG. 20 is a plan view showing the shape of the photonic crystal region of an optical deflection element according to the fourth embodiment of the present invention.
Figure 21:
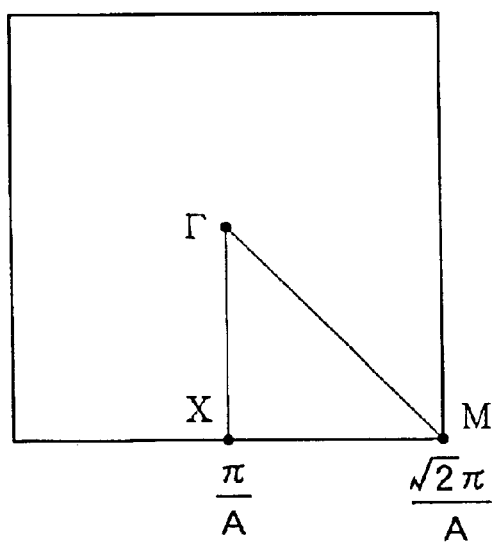
FIG. 21 is a diagram showing the first Brillouin zone of the photonic crystal region of the optical deflection element according to the fourth embodiment of the present invention.

FIG. 20 is a plan view showing the shape of the photonic crystal region of an optical deflection element according to the fourth embodiment of the present invention. Besides, FIG. 21 is a diagram showing the first Brillouin zone of the photonic crystal region of the optical deflection element according to this embodiment.

As shown in FIG. 20, a plurality of cavities 19 which are parallel to an entrance end face 11 and each of which is in the shape of a column having a radius "r" are arranged in the shape of square lattice at a lattice constant "A". Besides, the entrance end face 11 is parallel to a Γ-x direction in the first Brillouin zone as shown in FIG. 21. In this embodiment, the effective refractive index "n" of a silicon substrate 10 is 3.065, the radius "r" of each cavity 19 is 0.312A, and the cavities 19 are filled up with air.

Figure 22A:
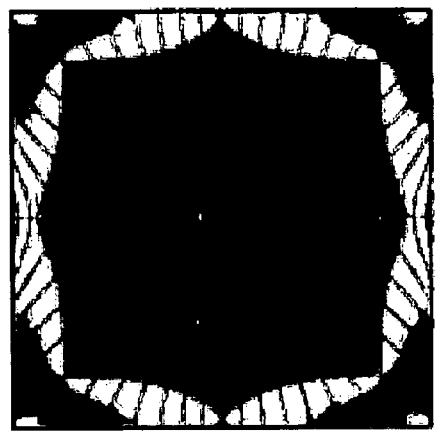
FIGS. 22A–22C are diagrams in which the values of a ratio q/p for the first band to the third band are respectively shown within the range of the first Brillouin zone in the photonic crystal region.
Figure 22B:
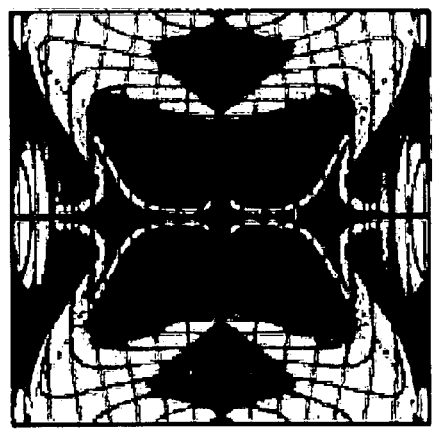
Figure 22C:
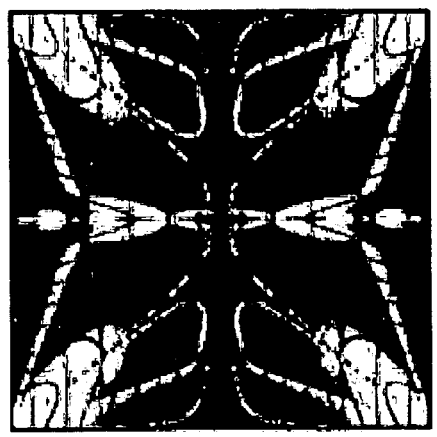

FIGS. 22A–22C are diagrams in which the values of a ratio q/p for the first band to the third band are respectively shown within the range of the first Brillouin zone in the photonic crystal region 12. It is understood that regions of high resolutions exist also in this embodiment.

Figure 23:
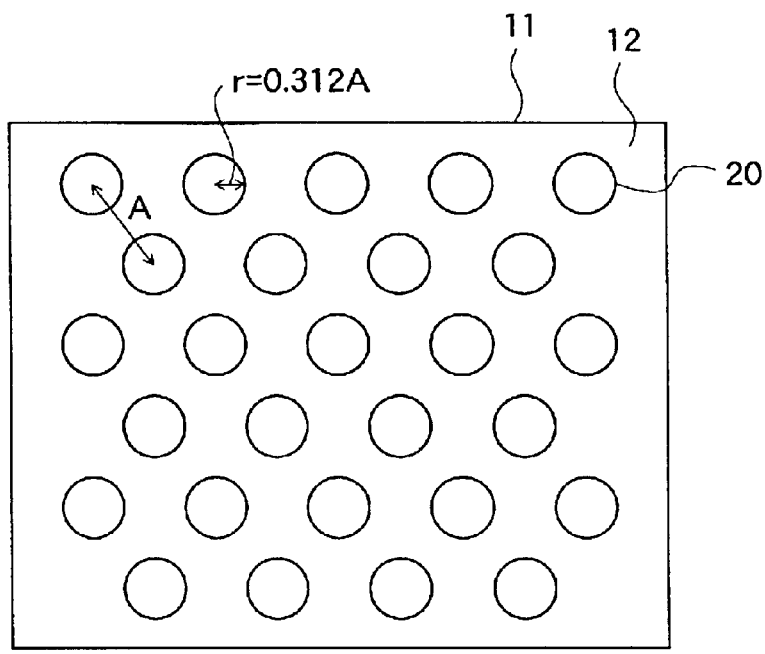
FIG. 23 is a plan view showing the shape of the photonic crystal region of an optical deflection element according to the fifth embodiment of the present invention.

FIG. 23 is a plan view showing the shape of the photonic crystal region of an optical deflection element according to the fifth embodiment of the present invention.

Figure 24:
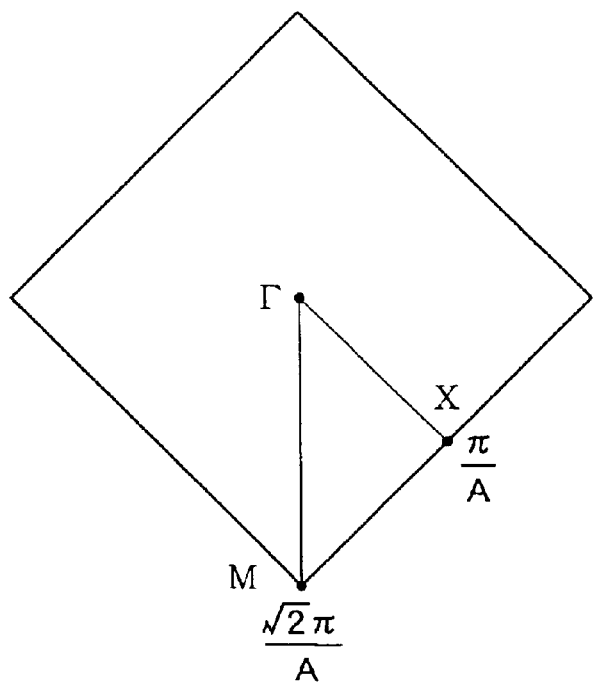
FIG. 24 is a diagram showing the first Brillouin zone of the photonic crystal region of the optical deflection element according to the fifth embodiment of the present invention.

As shown in FIG. 23, a plurality of cavities 20 which are parallel to an entrance end face 11 and each of which is in the shape of a column having a radius "r" are arranged in the shape of square lattice at a lattice constant "A". Besides, the entrance end face 11 is parallel to a Γ-M direction in the first Brillouin zone shown in FIG. 24. In this embodiment, the effective refractive index "n" of a silicon substrate 10 is 3.065, the radius "r" of each cavity 20 is 0.312A, and the cavities 20 are filled up with air.

Figure 25A:
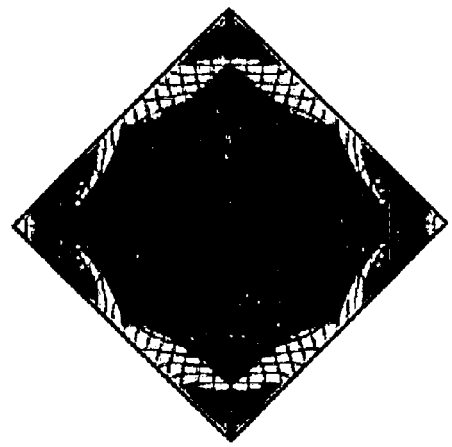
FIGS. 25A–25C are diagrams in which the values of a ratio q/p for the first band to the third band are respectively shown within the range of the first Brillouin zone in the photonic crystal region.
Figure 25B:
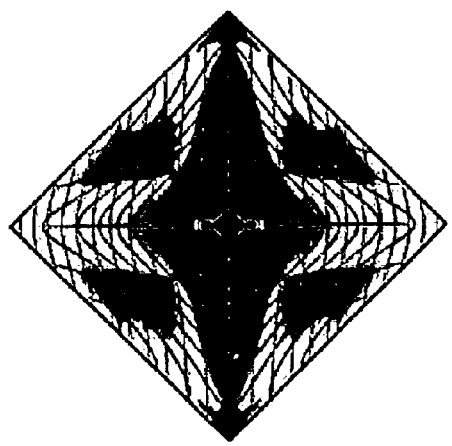
Figure 25C:
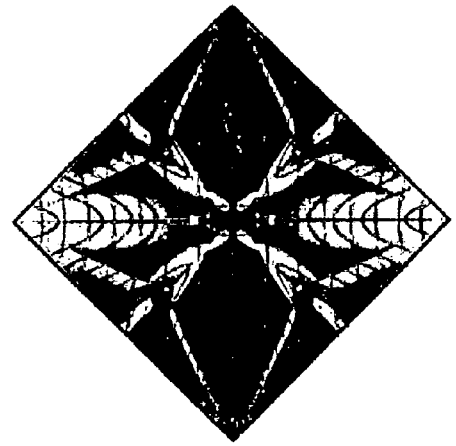

FIGS. 25A–25C are diagrams in which the values of a ratio q/p for the first band to the third band are respectively shown within the range of the first Brillouin zone in the photonic crystal region 12. It is understood that regions of high resolutions exist also in this embodiment. As compared with that of the fourth embodiment, a frequency range of high resolution widens more near the region of an incident angle of 8° for the second band, so that the fifth embodiment is usable in a wider wavelength range.

In this way, the optical deflection element which has the high wavelength resolution characteristic in the wide wavelength range can be designed by determining the shape of each cavity and the arrangement of the cavities in the photonic crystal region 12.

As described above, according to the present invention, it is possible to enhance the wavelength resolution of an optical deflection element employing a photonic crystal and to heighten the functions of the optical deflection element. Besides, since the size of the crystal necessary for obtaining a predetermined wavelength resolution can be calculated, the crystal of unnecessarily large size need not be prepared. It is accordingly permitted to reduce the size of the element and to curtail the cost thereof.

What is claimed is:

1. An optical deflection element for splitting light rays in accordance with a wavelength of incident light, comprising:
a photonic crystal having an entrance end face and an exit end face, and having a refractive index which periodically changes depending upon positions thereof, wherein:
said element includes a region in which a propagation angle $\theta_C$ of the incident light within said photonic crystal changes in accordance with the wavelength of the incident light having entered at an incident angle $\theta_{IN}$ into the entrance end face so as to split the light rays having different wavelengths in accordance with different beam positions on the exit end face caused by a change of the propagation angle $\theta_C$ based on the wavelength of the incident light, and a relationship among a wavelength λ of the incident light in vacuum, a lattice constant A of said photonic crystal, the incident angle $\theta_{IN}$ and the propagation angle $\theta_C$ satisfies $(\partial\theta_C/\partial(A/\lambda))/(\partial\theta_C/\partial\theta_{IN})>10$.

2. An optical deflection element for splitting light rays in accordance with a wavelength of incident light, comprising:

a photonic crystal having an entrance end face and an exit end face, and having a refractive index which periodically changes depending upon positions thereof, wherein:

said element includes a region in which a propagation angle $\theta_C$ of the incident light having a beam width $2w_0$ within said photonic crystal changes in accordance with the wavelength of the incident light having entered at an incident angle $\theta_{IN}$ into the entrance end face so as to split the light rays having different wavelengths in accordance with different beam positions on the exit end face caused by a change of the propagation angle $\theta_C$ based on the wavelength of the incident light, and a center wavelength $\lambda$ of a wavelength range of the incident light in vacuum, a lattice constant A of said photonic crystal, a refractive index n of a material at said entrance end face, a wavelength resolution $\Delta\lambda$ of said optical deflection element and an optical path length L along which the entered light propagates within said photonic crystal satisfy $\{(\partial\theta_C/\partial(A/\lambda))/(\partial\theta_C/\partial\theta_{IN})\}\cdot 2\lambda^3/(\pi n A w_0) > \Delta\lambda$, and $\pi n w_0^2/(\{\lambda \cdot (\partial\theta_C/\partial\theta_{IN})\}) < L$.

3. An optical deflection element according to claim 1, wherein said photonic crystal has an index profile in a shape of triangular lattice, said entrance end face is formed on a plane which is parallel to a Γ-J direction of the triangular lattice and dispersion of a second band is utilized.

4. An optical deflection element according to claim 2, wherein said photonic crystal has an index profile in a shape of triangular lattice, said entrance end face is formed on a plane which is parallel to a Γ-J direction of the triangular lattice and dispersion of a second band is utilized.

5. An optical deflection element according to claim 3, wherein a shape of a low index part of said index profile is prolonged in a direction perpendicular to the entrance end face of said photonic crystal.

6. An optical deflection element according to claim 4, wherein a shape of a low index part of said index profile is prolonged in a direction perpendicular to the entrance end face of said photonic crystal.

7. An optical deflection element according to claim 1, wherein said photonic crystal has an index profile in a shape of square lattice, said entrance end face is formed on a plane which is parallel to a Γ-M direction of the square lattice and dispersion of a second band is utilized.

8. An optical deflection element according to claim 2, wherein said photonic crystal has an index profile in a shape of square lattice, said entrance end face is formed on a plane which is parallel to a Γ-M direction of the square lattice and dispersion of a second band is utilized.

* * * * *